Oct. 8, 1940.   K. G. McKILLOP   2,217,285
CANDY MACHINE
Filed April 3, 1939   2 Sheets-Sheet 1
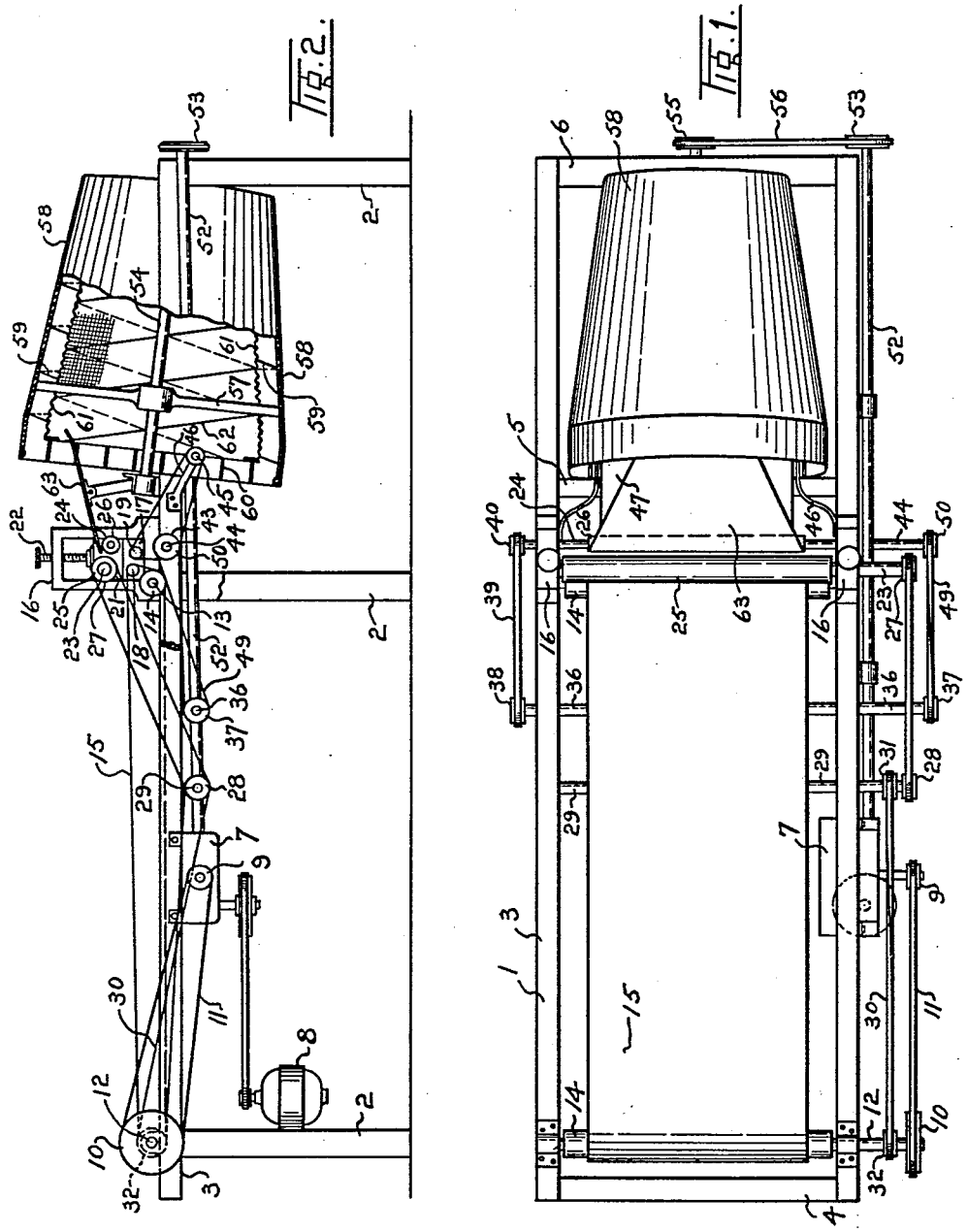
INVENTOR.
KEBIR GARNET McKILLOP.
ATTORNEY.

Oct. 8, 1940.   K. G. McKILLOP   2,217,285
CANDY MACHINE
Filed April 3, 1939   2 Sheets-Sheet 2

INVENTOR.
KEBIR GARNET McKILLOP.
ATTORNEY.

Patented Oct. 8, 1940

2,217,285

UNITED STATES PATENT OFFICE 2,217,285

CANDY MACHINE

Kebir Garnet McKillop, Vancouver, British Columbia, Canada

Application April 3, 1939, Serial No. 265,662
In Canada June 25, 1938

1 Claim. (Cl. 107—7)

My invention relates to improvements in candy machines which are particularly adapted for use in separating cut caramel or marshmallows. An object of the invention is to provide means for separating the cut material by gripping and pulling it from the mass while it is being moved upon an endless belt or suitable conveyor.

The invention consists of a separating structure having moving parts operated at different speeds, as will be more fully described in the following specification and shown in the accompanying drawings, in which:

Fig. 1 is a plan view of the invention.

Fig. 2 is a side elevational view showing the conveyor belt and drum rotating drives.

In the drawings like characters of reference indicate corresponding parts in each figure.

Figure 3:
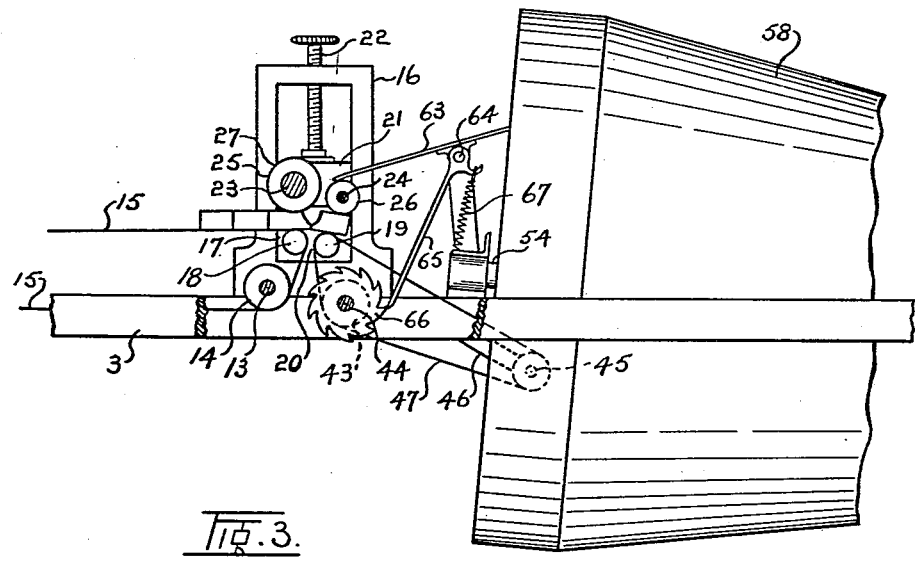
Fig. 3 is a detail elevational view of the separating mechanism.
Figure 4:
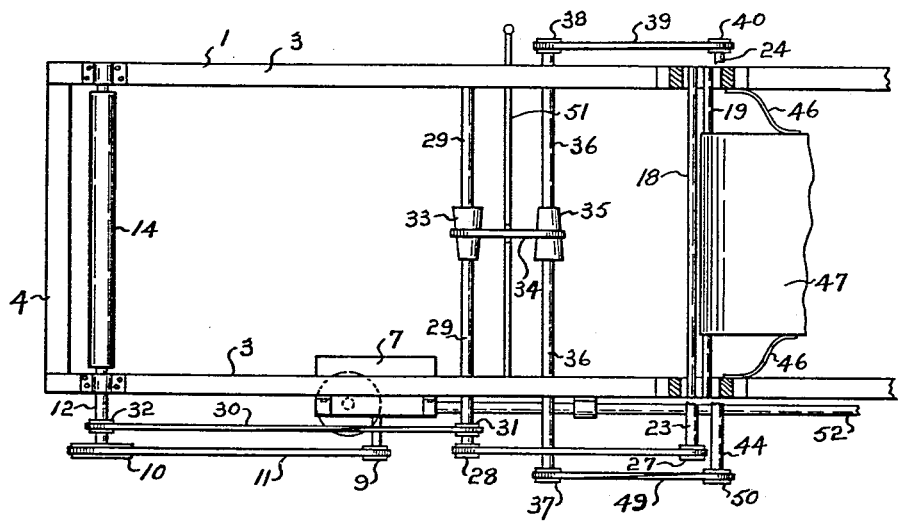
Fig. 4 is a fractionated plan view showing the driving train.

The numeral 1 indicates a frame consisting of uprights 2, longitudinal members 3 and transverse members 4, 5 and 6. Supported from one of the longitudinal members 3 is a reduction gear 7 which is belt driven from a motor 8 and a pulley 9 which drives a pulley 10 by means of a belt 11. The pulley 10 is fitted to a transverse shaft 12, which shaft and a similar shaft 13 are fitted with rollers 14 for the purpose of supporting an endless conveyor belt 15. Adjacent the shaft 13 is a pair of standards 16 carrying fixed bearings 17 for transverse idler shafts 18 and 19. These shafts are relatively small and are relatively close to each other to define a small intermediate gap 20 through which small caramels may not drop. The idler shaft 18 is mounted above the roller 13 and is engaged by the conveyor belt 15. Vertically adjustable bearing blocks 21 are fitted in the standards 16 and adjusting screws 22 are provided for adjusting their position vertically. Journalled in the bearing blocks 21 are shafts 23 and 24 fitted with rollers 25 and 26 respectively.

The shaft 23 is fitted with a pulley 27 and is belt driven from a pulley 28 upon a transverse shaft 29 which in turn is driven by a cross belt 30 carried by pulleys 31 and 32 fitted to the shafts 29 and 12 respectively, so that the peripheral travel of the roller 25 of the shaft 23 will be at the same speed as the conveyor belt 15.

The shaft 29 is fitted with a cone pulley 33 and through a belt 34 drives a reversely disposed cone pulley 35 which is fitted upon a counter shaft 36. The shaft 36 is fitted with a pulley 37 at one end and a pulley 38 at the other, the pulley 38 being connected by a belt 39 to a pulley 40 which is secured to the shaft 24. The idler shaft 19 coacts with a roller 43 upon a shaft 44 and an idler shaft 45 carried by inwardly projecting arms 46 to drive an inclined conveyor belt 47.

The conveyor belt 47 is driven by the pulley 37 upon the shaft 36 a crossed belt 49 and a pulley 50 upon the roller shaft 44. The crossed belt 49 causes the inclined conveyor belt 47 to travel in the same direction as the conveyor belt 15.

The driving belt 34 running upon the cones 33 and 35 is moved as desired by a belt shifter 51 of any suitable type and the drive is so proportioned as to cause the peripheral travel of the roller 26 and the inclined conveyor bracket 47 to be selectively greater than the travel of the conveyor belt 15.

Driven from the reduction gear 7 is a shaft 52 extending through to the delivery end of the machine and having at its free end a pulley 53, and mounted longitudinally of the frame 1 is an inclined shaft 54 fitted with a pulley 55 driven from the pulley 53 by a belt 56. The shaft 54 is fitted with one or more spiders 57 which support a conical drum 58 having a helix 59 on its inner periphery which urges material dropping onto the walls of the drum towards its inner end where the drum is provided with flights 60 for the purpose of raising the material received from the helix 59. Supported concentrically inside the drum 58 is a conical screen 61 which is also provided on its inner periphery with a helix 62. This helix tends to urge material dropped from the inclined conveyor belt 47 through the screen to discharge from the outer end of the drum 58. Rockingly mounted above the transverse frame member 5 is a chute 63 which extends at its upper end into the drum and under the overhanging flights. This chute is carried upon a shaft 64 and upon the shaft is an arm 65 which is swung in one direction by a cam wheel 66 mounted upon the shaft 44 and is swung in the opposite direction by a spring 67.

Assuming that slabs of marshmallow are to be separated into individual cubes and coated with roasted nut, a quantity of granulated nut is put into the drum 58 and the machine is set in motion. The slabs which have been previously cut into cubes but remain in slab form by inherent adhesion are placed upon the conveyor 15 preferably diagonally and as each slab reaches the roller 25 it is gripped thereby and is held down flat upon the conveyor and is then fed through to the inclined conveyor 47 and the roller 26, both of which are moving at a higher speed than the conveyor 15 and the roller 25. The increase of speed above referred to stretches the marshmallow until a cut in the slab is above the gap 20, when the tension causes the cubes to separate. Granulated nut is fed onto the chute 63 which is continually vibrating and gravitated onto the marshmallow as it passes across the gap, some of it dropping onto the vertical cut surfaces of the marshmallow. The separation of the cubes actually takes place after the cut has passed over the gap 20, hence little or no coating material falls through said gap. The separated cubes roll down the inclined conveyor and are dropped into the conical screen 61 where they are tumbled and urged by the helix 62 to discharge, while being sprinkled with granular nut falling from the inclined conveyor 47 and from the flights 60 and also from some falling from the helix 59. The sprinkling of the coating will become less towards the outer end of the drum and the dropping of coating material from the cubes will decrease as the cubes progress through the screen. The dropped coating material is returned by the helix 59 and is carried up to the invert of the drum by the flights 60 to again be dropped onto the chute 63 for coating new material.

What I claim as my invention is:

In a machine for separating cubes from a candy slab, a horizontal conveyor comprising a pair of spaced rollers and an endless conveyor belt, a roller directly over one of the first named rollers adapted to press down upon the candy slab and hold it flat upon the belt at the point of discharge, an inclined conveyor belt adapted to receive the candy from the first named conveyor belt and a roller mounted above the receiving end of the second named conveyor and below the axis of the candy slab pressing roller, said last named roller being driven and adapted to break down the leading edge of the slab.

KEBIR GARNET McKILLOP.